No. 706,593. Patented Aug. 12, 1902.
H. PECKMAN.
COMBINED CORNSTALK HARVESTER AND SHOCKER.
(Application filed June 20, 1901.)
(No Model.) 5 Sheets—Sheet 1.

No. 706,593. Patented Aug. 12, 1902.
H. PECKMAN.
COMBINED CORNSTALK HARVESTER AND SHOCKER.
(Application filed June 20, 1901.)
(No Model.) 5 Sheets—Sheet 3.

Inventor
Herman Peckman.

Witnesses

By H. B. Willson & Co.
Attorneys

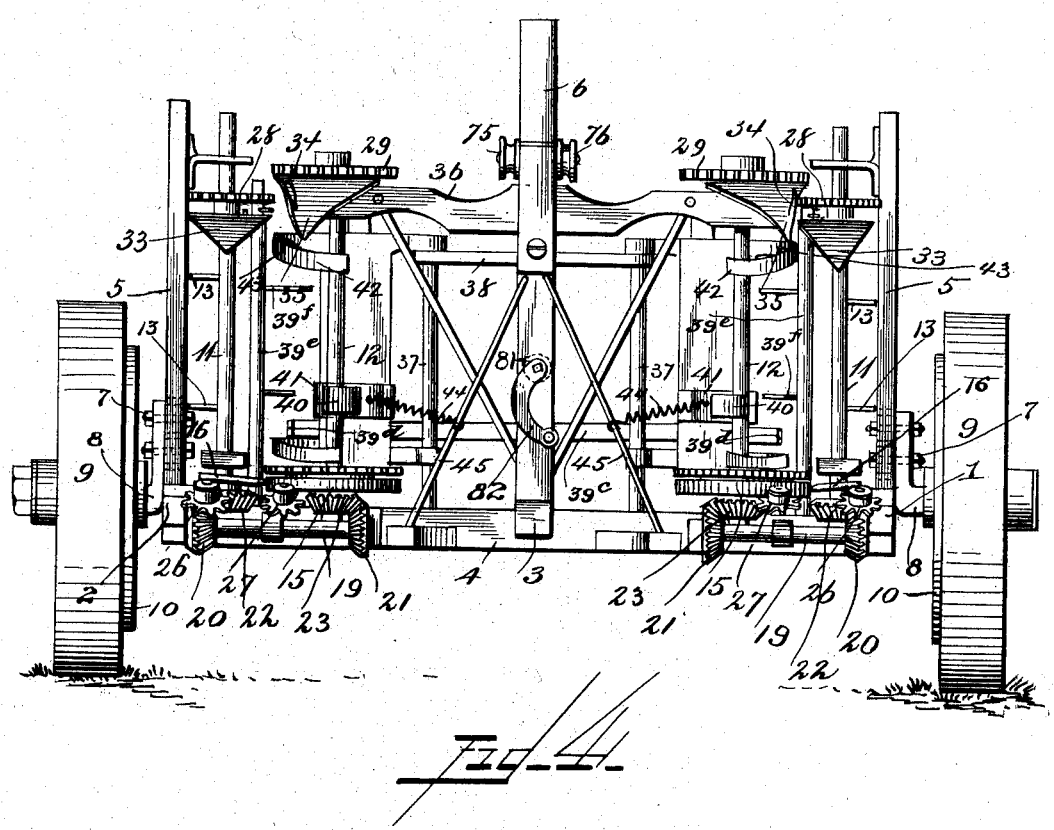

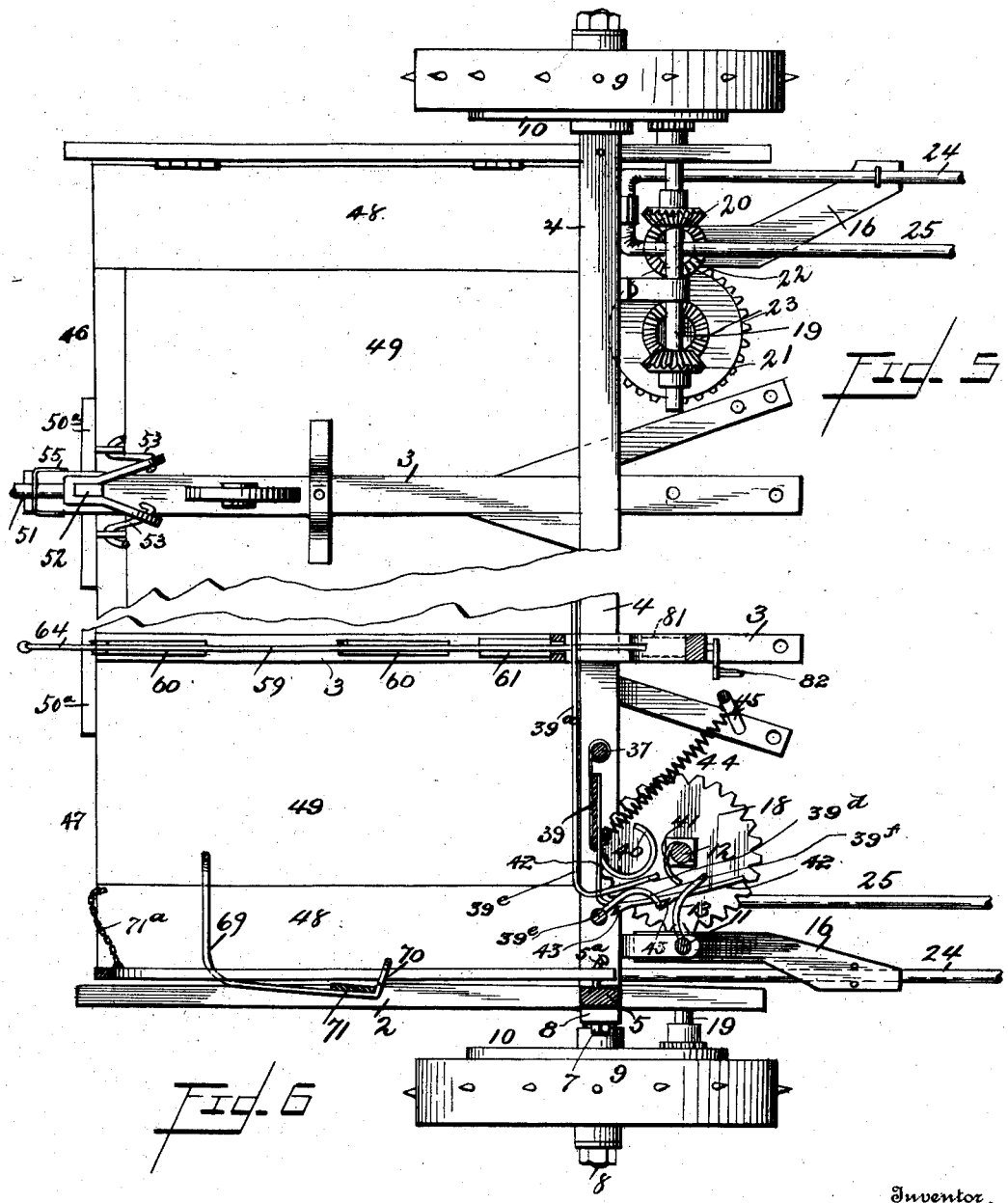

UNITED STATES PATENT OFFICE.

HERMAN PECKMAN, OF ARGENTINE, KANSAS.

COMBINED CORNSTALK HARVESTER AND SHOCKER.

SPECIFICATION forming part of Letters Patent No. 706,593, dated August 12, 1902.

Application filed June 20, 1901. Serial No. 65,278. (No model.)

*To all whom it may concern:*

Be it known that I, HERMAN PECKMAN, a citizen of the United States, residing at Argentine, in the county of Wyandotte and State of Kansas, have invented certain new and useful Improvements in a Combined Cornstalk Harvester and Shocker; and I do declare the following to be a full, clear, and exact description of the invention, such as will enable others skilled in the art to which it appertains to make and use the same.

The invention relates to a combined cornstalk harvester and shocker.

The object of the invention is to provide a machine of this character which shall be simple of construction, durable in use, and comparatively inexpensive of production and which will harvest at one time two rows of cornstalks, compress them into a single bundle or shock, and discharge the shock in standing position on the ground.

With this and other objects in view the invention consists of certain novel features of construction, combination, and arrangement of parts, which will be hereinafter more fully described, and particularly pointed out in the appended claims.

Figure 1:
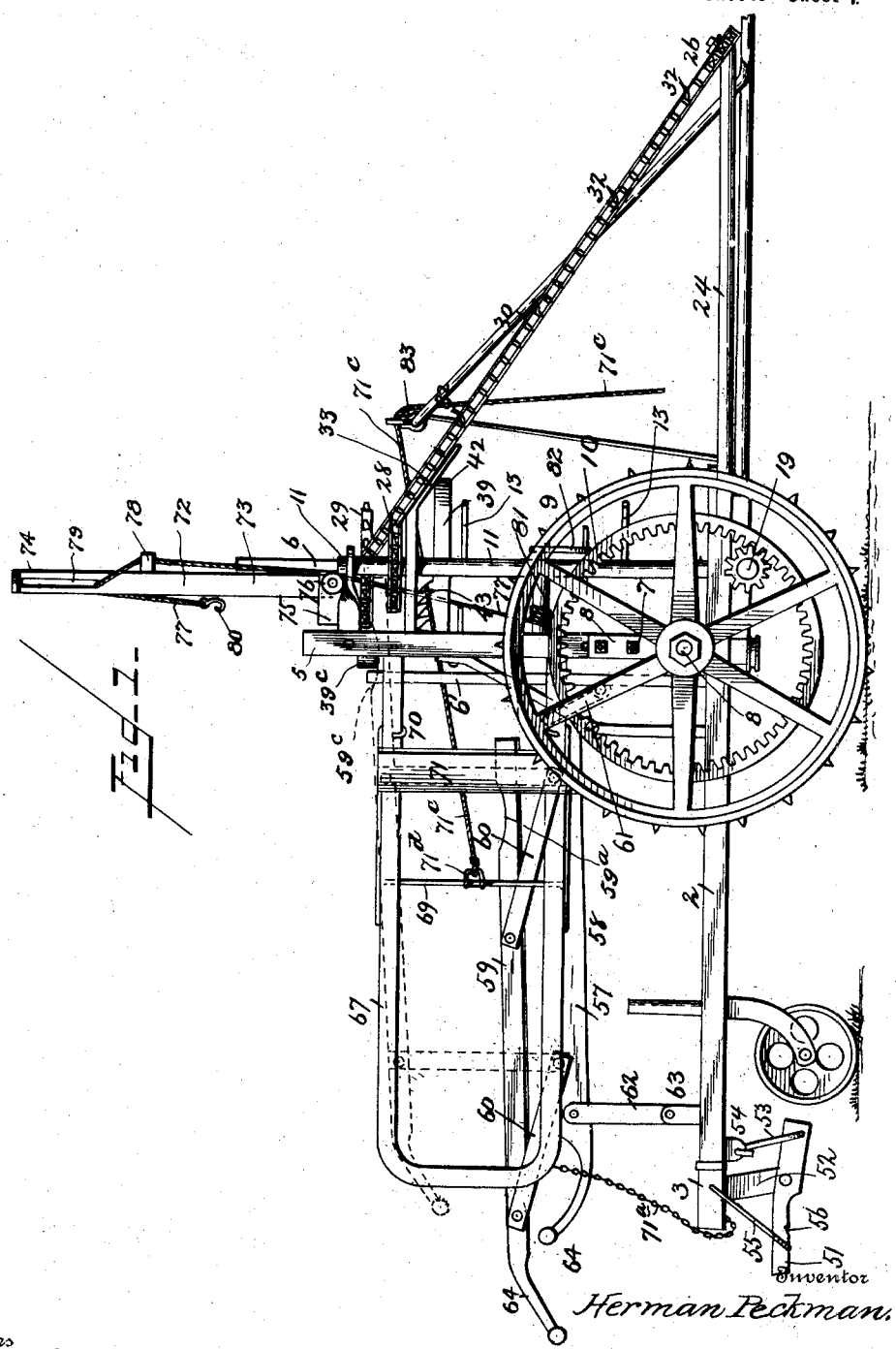
Figure 2:
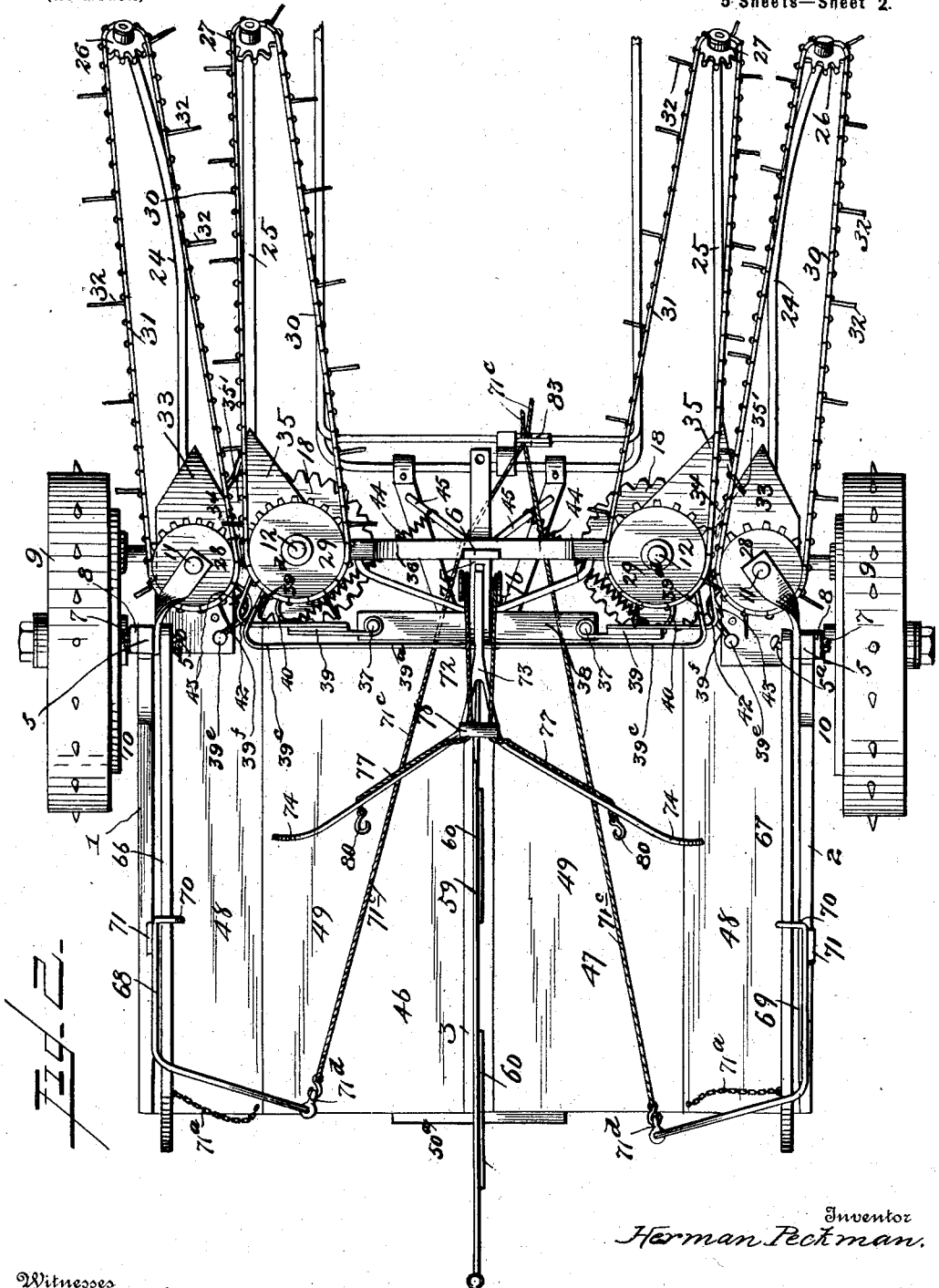
Figure 3:
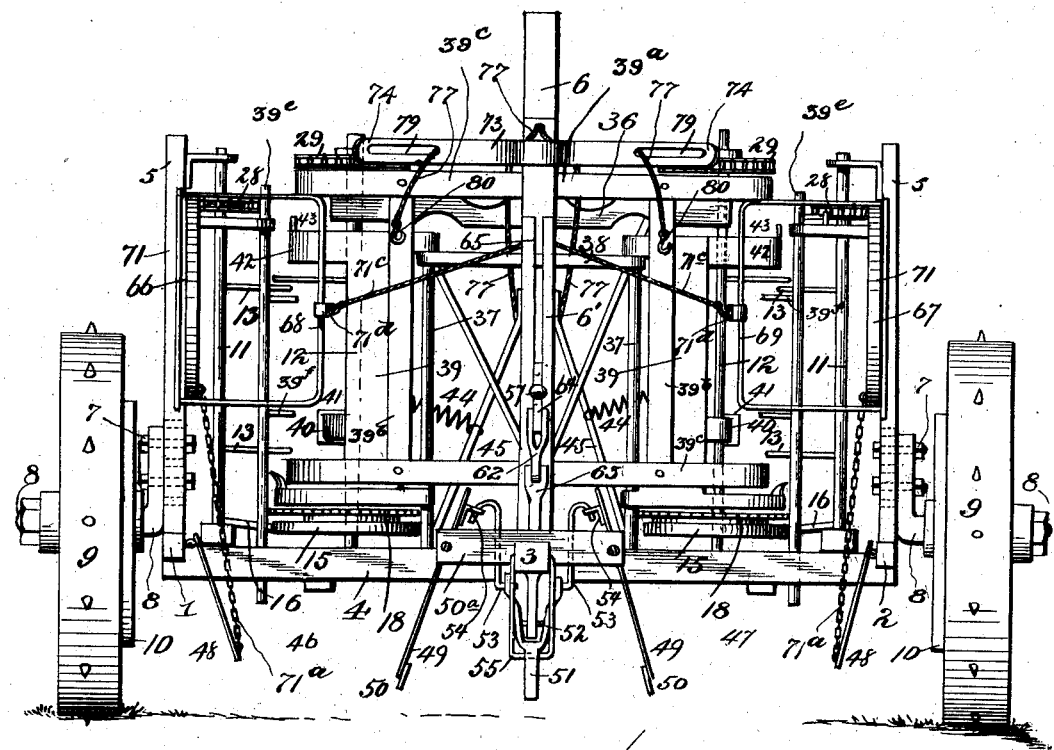
Figure 7:
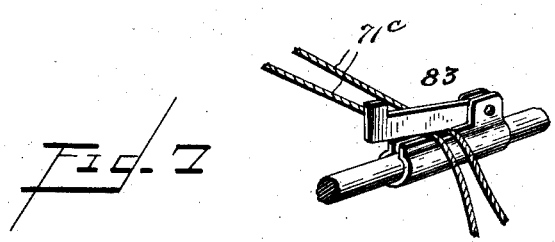

In the accompanying drawings, Figure 1 is a side view of the machine, the parts being shown in the position they assume as the machine is drawn forward. Fig. 2 is a top plan view showing the parts in position to give the shock its final compression preparatory to tying it. Fig. 3 is a rear view, the platforms being shown in their tilted position and the partition in its lowered position and the shock discharged upon the ground. Fig. 4 is a front view of the machine. Fig. 5 is a bottom plan view through one side of the machine to illustrate the gearing for actuating the shafts that operate the conveyers. Fig. 6 is a horizontal sectional view through one side of the machine looking downwardly; and Fig. 7 is a detail perspective view of the friction-catch 83, which the driver operates with his foot.

The supporting-frame of the harvester consists of the parallel side pieces 1 and 2, the central parallel piece 3, the forward cross-piece 4, the side posts 5, and the two central posts 6 and 6'. From the side posts 5 is secured adjustably, preferably by bolts and nuts 7, stud-axles 8, upon which are journaled traction-wheels 9. This adjustment permits of the frame of the machine being raised or lowered with respect to the ground to vary the cut of the stalks. Fixed to or cast integral with each traction-wheel is a drive-gear 10.

Upon each side of the machine, journaled in bearings, are shafts 11 and 12, the former being provided with curved beater-arms 13 and the latter provided at its lower end with a wooden disk 15, which coöperates with the edge of the fixed cutter-blade 16 and has fixed to it a toothed feed-disk 18.

19 denotes a horizontal shaft journaled in suitable bearings secured to the forward cross-piece of the frame and provided at one end with a pinion in mesh with the drive-gear and with beveled gears 20 and 21, which mesh, respectively, with similar gears 22 and 23 on the shafts 11 and 12 and by which movement is transmitted to said shafts. Projecting from the forward cross-bar at each end thereof are two rods 24 and 25, each having at its forward end sprocket-wheels 26 and 27, and fixed to the upper ends of the shafts 11 and 12 are sprocket-wheels 28 and 29. Endless chains 30 and 31 are engaged with each set of sprocket-wheels and are provided with gathering-fingers 32, which engage the cornstalks fed between the adjacent runs of the belt and hold them in an upright position as the machine is drawn along and also tend to feed them to the cutting apparatus. Secured to the upper ends of the side posts and projecting forwardly from under the sprocket-wheels 28 are pointed guard-plates 33 for the inner runs of the conveyer-chain 30, which have on their inner side upwardly and rearwardly projecting prongs 34, so as to prevent the upper end of the cornstalk from leaning forward as it is being conveyed rearwardly by the coacting chains of each set, and for a similar purpose are provided the pointed guard-plates 35, which project under and in advance of the sprocket-wheels 29 and are secured to the ends of a cross-piece 36, secured to the central post 6. The plates 35 are also provided with upwardly and rearwardly projecting prongs 35'.

37 denotes a post at each side of the machine, projecting upwardly from the cross-piece 4 and connected at its upper end to the cross-piece 38.

39 denotes packers having their inner edges pivoted to the said posts and having forward-curved arms 40, which are adapted to be engaged by a tappet device 41, fixed to the shafts 12, whereby when said shafts are rotated the packers will be vibrated. The upper end of each packer has a forwardly-projecting arm 42, provided with rearwardly-projecting barbs 43, which serve to feed the stalks rearwardly after they have been freed from engagement with the conveyer-chains.

44 denotes springs connected to braces 45 and to the packers and serve to draw said packers forwardly.

Just in rear of the packers 39 is a vertical frame $39^a$, consisting of the vertical pieces $39^b$, connecting the upper and lower horizontal cross-pieces $39^c$, which terminate in forwardly-bent arms $39^d$, which serve as guards to guide the cornstalks onto the platforms, hereinafter described.

$39^e$ denotes vertical posts extending upward from the cross-piece 4, adjacent to the outer ends of the cross-pieces $39^c$, and provided with curved guide-arms $39^f$, which guide the stalks onto the said platforms.

46 and 47 denote platforms arranged immediately at the rear of the cutting apparatus. Each platform consists of two hinged sections 48 and 49, the sections 48 being hinged to the parallel side pieces 1 and 2 to swing downwardly and the sections 49 being hinged each at one end to the cross-piece 4 and at the other end to the cross-bar $50^a$, secured to the rear end of the central piece 3. Each section 49 is provided along its marginal edge with a longitudinal cleat 50, so that when the sections of each platform are raised in horizontal position the section 49 of each platform will support its coacting section 48. Any suitable means may be employed for holding these platforms in horizontal position, but that shown is preferred and consists of a lever 51, pivoted to a stud 52, projecting downwardly from the rear end of the central piece 3 and pivotally connected by links 53 to lugs 54, connected to the under sides of the sections 49 at their rear ends. A loop or bail 55 is pivoted to the rear end of the central piece 3 and is adapted to be swung up into engagement with and hold the lever in horizontal position, so as to hold the sections of the platform in a similar position. In order to insure a positive lock, the under side of the free end of the lever may be provided with notches 56, which are engaged by the loop or bail. 57 denotes a partition to separate or divide the platforms. This partition has a vertical movement and preferably consists of two bars 58 and 59, connected by links 60, thus forming practically a parallel rule. The bar 58 has its forward end connected by a link 61 to a stud on the post 6' and has its rear end connected by a link 62 to a post 63, projecting upwardly from the central piece 3, and each bar is provided at its rear end with handles 64, by means of which it may be raised or lowered into position. The forward ends of said bars work through a closed-end slot 65, formed in the post 6'. To elevate the partition, the upper bar is first swung upwardly and forwardly, its forward end projecting through the slot 65 and engaging the end wall thereof and the cut-away portion $59^a$ on the upper side of the bar 59 being directly beneath the upper cross-piece $39^c$ of the frame $39^a$. The lower bar is now swung upwardly and forwardly. When the links reach a dead-center, which they do when they are in a vertical line, the bars are securely locked by the pressure of the cut-away portion $59^a$ upon the under side of the cross-piece $39^c$. To lower the bars, the lowermost link is pulled rearwardly, thus pulling the links off the dead-center and permitting the two bars to be lowered parallel.

The shock-formers consist of two frames 66 and 67, preferably U-shaped, which have their ends pivoted at $5^a$ to the side posts 5 to swing in a horizontal plane. Mounted to slide longitudinally upon these hinged frames are sliding frames 68 and 69, which preferably consist of rods of proper strength bent into U form and provided at their ends with loops 70, which are engaged with parallel members of the hinged frame and are braced by vertical bars 71.

$71^a$ denotes chains connected to the rear inner ends of sections 48 of the platform and to the rear ends of the hinged frames, so that when said hinged frames are swung inwardly the sections 48 of the platforms will be elevated.

$71^c$ denotes ropes the forward ends of which are passed under a friction-catch 83 within convenient reach of the driver's foot, and the rear ends of which are provided with hooks, which are connected to eyes $71^d$.

72 denotes the shock-compressor, which consists of a frame 73, having forked arms 74 at its rear end and having its forward end pivoted to swing vertically between ears 75 projecting from the post 6. Journaled on the outer sides of these ears are sheaves 76, around which pass ropes 77, the rear ends of which pass through a guide-eye 78 on the compressor-frame and then through longitudinal slots 79 in the ends of the forked arms of said frame and are provided with hooks 80. The opposite ends of these ropes lead from the sheaves to and are connected with a windlass 81, operated by a crank 82.

When in operative position, the platforms are elevated. The compressor-frame is also elevated to be out of the way. The partition is elevated to its highest position. The hinged frames are swung inwardly into engagement with the partition, and the sliding frames are moved forwardly upon the hinged frames and connected to the ropes $71^c$, which have their forward ends under the friction-latch 83, upon which the driver's foot is adapted to be placed. As the machine is drawn along the cornstalks in each row will be gathered by the endless conveyers, forced rearwardly, severed by the cutting apparatus, knocked rearwardly by the beater-arms, and forced into separate bundles or shocks by the packers operated by the tappet devices on the shafts 12, each packer, as above stated, being provided with a forwardly-projecting curved arm having barbs to prevent the retrograde or forward movement of the severed cornstalks. The density of the shock being formed is regulated by the operator, who, with his foot upon the friction-latch, lets the rope 71$^c$ slide from under said latch as the severed stalks pass rearwardly from the cutting apparatus, and as the shocks are being formed the sliding frames slide rearwardly to make room for the oncoming stalks. After the desired amount of stalks has been deposited on the platforms the compressor-frame is lowered to a horizontal position, the rear ends of its cords passed around the upper ends of the two partially-formed shocks, and by turning the windlass the upper ends of said shocks are tightly bound together, and in this position the wire or tie is passed around the upper end of said shocks to secure them in position. The ropes 71$^c$ are now disconnected, the partition lowered to its lowermost position, and the platforms dumped, thus allowing the butt-ends of the stalks to fall upon the ground, and by starting the machine forward the partition will be drawn out from between the stalks, thus leaving the shock in a standing position on the ground. The parts of the machine are now restored to their normal positions, so that the machine may resume its work.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a cornstalk-harvester, the combination with the cutting apparatus, of two dumping-platforms, one at the rear of each cutting apparatus, and a vertically-movable partition separating said platforms, and a shock-former, the parts of which are located above said platforms, said shock-former consisting of two hinged frames located at the side of the machine and capable of swinging inwardly, and annularly-curved frames mounted to slide upon said hinged frames, substantially as set forth.

2. In a cornstalk-harvester, the combination with the cutting apparatus, of two dumping-platforms, one at the rear of each cutting apparatus, and a vertically-movable partition separating said platforms, a shock-former, the parts of which are located above said platforms, said shock-former consisting of two hinged frames located one at each side of the machine and capable of swinging inwardly, and annularly-curved frames mounted to slide upon said hinged frames, and a shock-compressor mounted above the partition, substantially as set forth.

3. In a cornstalk-harvester, the combination with the cutting apparatus carried at each side of the machine, a platform arranged at the rear of each cutting apparatus to receive the severed stalks in standing position, a hinged compressor-frame having its rearward end forked and slotted, a windlass, ropes passed through the slots in said forked ends of the compressor-frame and connected to the windlass, substantially as set forth.

4. In a cornstalk-harvester, the combination with the cutting apparatus, of two platforms mounted at the rear of each cutting apparatus, frames hinged at the outer side and above each platform and capable of swinging inwardly, and a bail-shaped frame mounted to slide upon the hinged frame longitudinally, substantially as set forth.

5. In a cornstalk-harvester, the combination with a cutting apparatus, of two platforms mounted at the rear of each cutting apparatus, frames mounted at the outer side and above each platform and capable of swinging inwardly, and a bail-shaped frame mounted to slide upon the hinged frame longitudinally, a friction device, and ropes connected to the bail-shaped frame and the friction device, whereby as the shock is being formed the density may be controlled by increasing the friction upon the rope as it slides past the friction device, substantially as set forth.

In testimony whereof I have hereunto set my hand in presence of two subscribing witnesses.

HERMAN PECKMAN.

Witnesses:
 ALLEN T. MATHEWS,
 J. J. SWINGLEY.